(12) United States Patent
Champagne et al.

(10) Patent No.: US 12,275,498 B2
(45) Date of Patent: Apr. 15, 2025

(54) SEAT FOR PERSONAL WATERCRAFT

(71) Applicant: Taiga Motors Inc., Lasalle (CA)

(72) Inventors: William Champagne, Montreal (CA); Paul Achard, Montreal (CA); Matthew Schroeder, Lasalle (CA)

(73) Assignee: Taiga Motors Inc., Lasalle (CA)

( * ) Notice: Subject to any disclaimer, the term of this patent is extended or adjusted under 35 U.S.C. 154(b) by 500 days.

(21) Appl. No.: 17/701,076

(22) Filed: Mar. 22, 2022

(65) Prior Publication Data
US 2022/0315172 A1    Oct. 6, 2022

Related U.S. Application Data

(60) Provisional application No. 63/169,328, filed on Apr. 1, 2021.

(51) Int. Cl.
*B63B 29/04* (2006.01)
*B60N 2/015* (2006.01)
*B63B 17/00* (2006.01)

(52) U.S. Cl.
CPC .............. *B63B 29/04* (2013.01); *B60N 2/015* (2013.01); *B63B 17/00* (2013.01); *B63B 2029/043* (2013.01)

(58) Field of Classification Search
CPC ... B63B 29/00; B63B 29/04; B63B 2029/043; B63B 17/00; B63B 35/00; B63B 35/73; B60N 2/015
USPC .................................. 114/55.57, 55.52, 363
See application file for complete search history.

(56) References Cited

U.S. PATENT DOCUMENTS

| | | | |
|---|---|---|---|
| 5,542,371 A | 8/1996 | Harvey et al. | |
| 5,603,281 A | 2/1997 | Harvey et al. | |
| 6,880,483 B2 | 4/2005 | Fedders | |
| 7,004,091 B2 * | 2/2006 | Adamczyk | B63B 34/10 114/55.57 |
| 7,188,573 B2 | 3/2007 | Hirabara | |

* cited by examiner

*Primary Examiner* — Lars A Olson
(74) *Attorney, Agent, or Firm* — Dicke, Billig & Czaja, PLLC

(57) ABSTRACT

One example provides a seat assembly for a personal watercraft including a rigid seat support. The rigid seat support includes a base element to be rigidly connected to a deck of the personal watercraft, and a cantilever element rigidly connected to the base element and to extend unsupported above the deck in an aft direction when the base element is connected to the deck.

19 Claims, 12 Drawing Sheets

SEAT FOR PERSONAL WATERCRAFT

CROSS-REFERENCE TO RELATED APPLICATIONS

This application claims priority from U.S. Provisional Patent Application No. 63/169,328, filed Apr. 1, 2021, which is incorporated by reference in its entirety herein.

FIELD OF THE INVENTION

This disclosure relates generally to personal watercraft vehicles.

BACKGROUND

Personal watercraft continue to grow in popularity. During operation, both operators and passengers are subjected to forces resulting from high speed turns and unsmooth water conditions.

SUMMARY

One example provides a seat assembly for a personal watercraft including a rigid seat support. The rigid seat support includes a base element to be rigidly connected to a deck of the personal watercraft, and a cantilever element rigidly connected to the base element and to extend unsupported above the deck in an aft direction when the base element is connected to the deck.

The cantilever element may be disposed at an angle in a range from 155 to 180 degrees relative to the base element such that the cantilever element extends at an upward angle relative to the deck when the base element is connected to the deck.

The seat assembly may further include a seat mounted to the rigid seat support.

The seat may include a seat pan and a seat cushion disposed on the seat pan.

The seat cushion may define an operator position; and a passenger position, wherein an entirety of the passenger position and at least a portion of the operator position are disposed over the cantilever element.

An entirety of the operator position may be disposed over the cantilever element.

A portion of the operator position may be disposed over the base element.

The base element and cantilever element may be formed of an integral, continuous piece of material.

The base element and cantilever element may comprise separate elements joined by a welded connection.

The base element may have a forward-most connecting point opposite the cantilever element for connecting the base element to the deck. The cantilever element may have an aft-most end opposite the base element, in response to forces applied to the rigid seat support, the aft-most end of the cantilever element to deflect relative to the base element by a distance not exceeding 3% of a horizontal distance from the forward-most connecting point to the aft-most end.

The rigid seat support may further include interior stiffening structure to be disposed within an interior space of the personal watercraft, the base element to rigidly connect to the interior stiffening structure with the deck sandwiched there between so as to provide rigidity to the deck.

One example provides a personal watercraft including a hull, a deck disposed on the hull, and a rigid seat support. The rigid seat support includes a base element fixedly attached the deck, and a cantilever element fixedly connected to the base portion and longitudinally extending unsupported over the deck in an aft direction to form an area free of structure between an underside of the cantilever element and the deck.

The deck may include a mounting surface. The base element of the rigid seat support may be rigidly coupled to the mounting surface.

The deck may define a rear platform. The mounting surface may be positioned forward of the rear platform. The cantilever element may extend unsupported over the rear platform.

The cantilever element may extend at an upward angle relative to the rear platform.

The cantilever element may extend at an upward angle relative to the base element in a range from 155 to 180 degrees.

The deck may define an elevated superstructure forward of the rear platform. The mounting surface may be disposed on the superstructure.

The mounting surface may comprise a planar surface parallel to at least one of the rear platform and a waterline of the personal watercraft.

The base element and cantilever element may be formed of integral continuous piece of material.

The base element and cantilever element may be coupled by a welded connection.

The personal watercraft may include a seat mounted to the rigid seat support. The seat may comprise a seat pan and a seat cushion disposed on an upper side of the seat pan. The seat cushion may define a driver position and a passenger position aft of the driver position, wherein at least a portion of the driver position is positioned vertically over the cantilever element.

The seat may be releasably secured to the rigid seat support via a quick-release mounting system.

The seat cushion may have a thickness in a range from 50 millimeters to 100 millimeters.

The personal watercraft may provide an entirety of the driver position positioned vertically over the cantilever element.

The base element may be positioned forward of the driver position.

The rigid seat support may have a horizontal length from a forward most connection point to the deck to an aft-most end of the cantilever element in a range from 60 to 85 centimeters.

The aft-most end of the cantilever element may deflect vertically downward by not more than 3% of the horizontal length.

The rigid seat support may include at least one stiffening member disposed on an underside of the deck opposite the base element. The base element may be rigidly fixedly attached to the at least one stiffening member with the deck sandwiched there between so as to fixedly attach the base member to the deck and reduce deflection of the deck.

The base element may comprise first and second longitudinally extending base elements. The cantilever element may include first and second longitudinally extending cantilever elements. The first cantilever element may be rigidly connected to and extend from the first base element and together form a first longitudinal frame member, and the second cantilever element may be rigidly connected to and extend from the second base element and together form a second longitudinal frame member. The first and second longitudinal frame members may extend in parallel with one another.

The deck and hull form an interior space. The base element of each longitudinal frame member may be positioned on an outer surface of the deck. The rigid seat support system may include an interior support structure disposed within the interior space to which the base portion of each frame element is rigidly coupled.

The deck may include a horizontal mounting surface to which the base portion of each frame member is rigidly coupled.

The interior support structure may include at least one interior stiffening member disposed along an inner surface of the deck facing the interior space. The base element of each longitudinal frame element coupled to the at least one interior stiffening member with the deck sandwiched there between to prevent deflection of the deck.

The interior support structure may include at least one elongated member connecting the at least one stiffening member to the hull to further stiffen and prevent deflection of the deck.

For each longitudinal frame member, the cantilever element may extend at an upward angle relative to base element.

For each longitudinal frame member, the rigid seat support may include at least one gusset plate connecting the base element to the cantilever element to prevent deflection of the cantilever element relative to the base element.

The rigid seat support structure may include one or more transverse stiffener elements rigidly connected between the longitudinal frame members to add rigidity to the seat support structure.

The rigid seat support structure may include a stabilizer web rigidly connected between the cantilever elements of the longitudinal member to add rigidity to the seat support structure.

Each longitudinal frame member may be formed of a contiguous piece of material.

The base element and cantilever element may be connected to one another by a welded connection.

One example provides a seat assembly for a personal watercraft comprising a rigid seat support that may include at least two longitudinal frame members extending in parallel with one another, each frame member including a base element to be rigidly connected to a mounting surface of a deck of the personal watercraft; and a cantilever element rigidly connected to the base element and to extend in an aft direction unsupported above the deck when the base element is connected to the mounting surface of the deck.

The rigid seat support system may include an interior support structure disposed within an interior space of the watercraft on a side of the deck opposite the at least two longitudinal frame members and to which the base element of each longitudinal frame member is rigidly coupled such that the deck is to be sandwiched between the interior support structure and the base elements of the at least two longitudinal frame members to prevent deflection of the deck.

The interior support structure may include at least one interior stiffening member extending in a direction transverse to the at least two longitudinally extending frame members.

The interior support structure may include at least one elongated member to connect the at least one stiffening member to a hull of the watercraft to further stiffen and prevent deflection of the deck.

For each longitudinal frame member, the cantilever element may extend at an upward angle relative to base element.

Each longitudinal frame member may include at least one gusset plate connecting the base element to the cantilever element to prevent deflection of the cantilever element relative to the base element.

The rigid seat support structure may include one or more transverse stiffener elements rigidly connected between the longitudinal frame members to add rigidity to the seat support structure.

The rigid seat support structure may include a stabilizer web rigidly connected between the cantilever elements of the longitudinal member to add rigidity to the seat support structure.

Each longitudinal frame member may be formed of a contiguous piece of material.

The base element and cantilever element may be connected to one another by a welded connection.

The seat assembly may further include a seat mounted to the rigid support structure that comprises a seat pan and a seat cushion disposed on an upper side of the seat pan, the seat cushion defining a driver position and a passenger position, an entirety of the passenger position being positioned vertically above the at least two cantilever elements, and at least a portion of the driver position being position vertically above the at least two cantilever elements.

The seat may be releasably secured to the rigid seat support via a quick-release mounting system.

Additional and/or alternative features and aspects of examples of the present technology will become apparent from the following description, the accompanying drawings, and the appended claims.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Personal watercraft (PWC) continue to grow in popularity. Typically, a PWC includes a jet propulsion system to create a pressurized jet of water which creates thrust to propel the PWC through the water. Such propulsion systems typically draw water through an intake grate on an underside of a hull of the PWC, with the water being directed to a jet pump. Water ejected from the jet pump is directed through a venturi which further accelerates the water to provide additional thrust. The accelerated water jet is ejected from the venturi via a pivoting steering nozzle which is directionally controlled by a user operated steering mechanism to provide a directionally controlled jet of water to propel and steer the PWC. Traditionally, PWC have been powered by internal combustion engines. However, due to their quieter and cleaner drive systems, electric PWC represent an environmentally friendly alternative to traditional combustion-powered PWC.

When operating PWC at high speeds, both operators and passengers are subjected to forces generated by sharp turns and by rough water. In order to provide users with a comfortable ride and reduce operator fatigue, seats of PWC typically employ a suspension system. Such suspension systems typically include a seat frame which is pivotally coupled to a body of the PWC at a location forward of the seat, and a shock absorbing system (often a spring or piston type assembly) coupled between the seat frame and body at a location aft of the pivotal mounting location. The pivotal connection enables the seat/seat frame to pivot up and down, while the shock absorbing system dampens the forces on the operator and passengers. While such suspension systems are effective at reducing shocks to an operator and passenger, moving components are subject to increased wear and fatigue and, thus, represent failure points requiring periodic maintenance and replacement.

Figure 1:
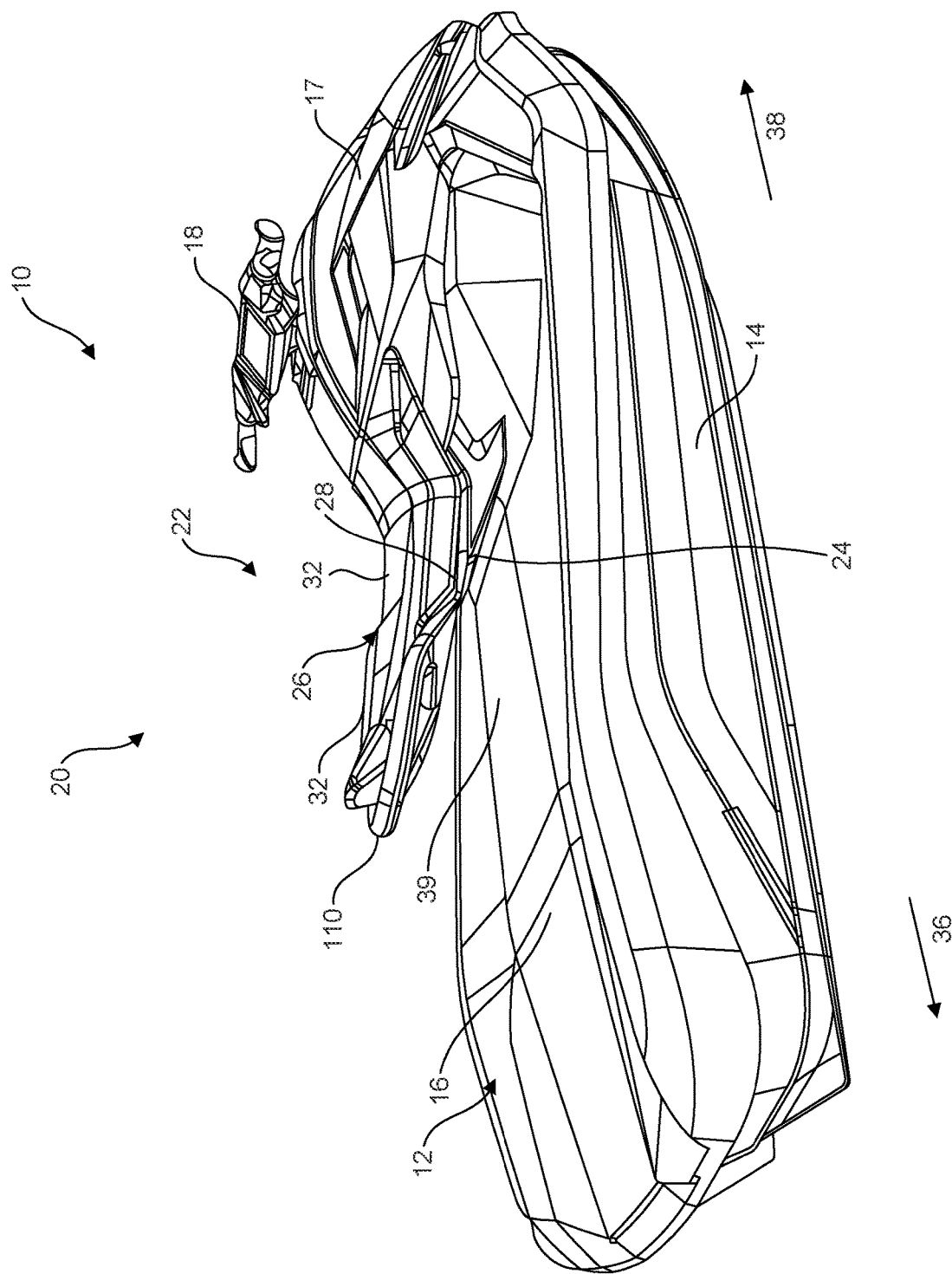
FIG. 1 is a perspective view generally illustrating a personal watercraft including a seat assembly in accordance with one example of the present disclosure.

FIG. 1 generally illustrates a PWC 10 employing a straddle seat assembly 20 including a seat 22 mounted to a rigid seat support 24 (hidden by seat 22 in FIG. 1), according to examples of the present disclosure. In one example, seat 22 includes a seat cushion 26 disposed on a seat pan 28, with seat cushion 26 defining an operator position 30 and a passenger position 32. PWC 10 includes a deck body 12 coupled in a sealed fashion to a hull 14, with deck body 12 defining a rear platform 16 which enables users to board PWC 10 from the water via the rear of the watercraft. In examples, as will be described in greater detail below, rigid seat support 24 is fixedly attached to deck body 12 and extends unsupported, in a cantilevered fashion, in an aft direction 36 (opposite forward direction 38) over deck body 12 to support seat 20 and form an open area 39 free of supporting structure between seat assembly 20 and rear platform 16. Open area 39 provides an unobstructed view from one side of PWC 10 to the other and gives seat 22 a "floating" or "suspended" appearance above rear platform 16. This "floating" or "suspended" appearance provides an attractive aesthetic for PWC 10. In one example, as will be described in greater detail below (e.g., see FIG. 11), seat assembly 22 further includes an aft-ward extending grab bar 110 to assist users in boarding PWC 10 via rear platform 16 and to provide passenger support when riding PWC 10.

In examples, as will be described in greater detail below, seat assembly 20, via rigid seat support 24, is fixedly mounted to deck body 12 forward of operator position 30. In one example, as described below, deck body 12 defines a raised superstructure 17 supporting a steering assembly 18, with rigid seat support 24 fixedly mounted to raised superstructure 17 forward of operator position 30. By employing a rigid seat support 24 having minimal deflection in response to applied forces, and employing seat cushion 24 as a shock absorber, seat assembly 20, in accordance with the present disclosure, employs no moving parts and thereby provides reduced maintenance and a longer life cycle relative to traditional pivotal seats employing suspension systems.

In examples, PWC 10 is electrically powered. In examples, an interior volume formed between hull 14 and deck body 12 may accommodate an electric motor (e.g., to drive a jet pump), batteries, a thermal management system, and other components for an electric drive system of PWC 10. Hull 14 may also include strakes and chines which provide, at least in part, riding and handling characteristics of PWC 10. The interior volume may also include any other components suitable for use with PWC 10, such as storage compartments, for example.

Figure 2A:
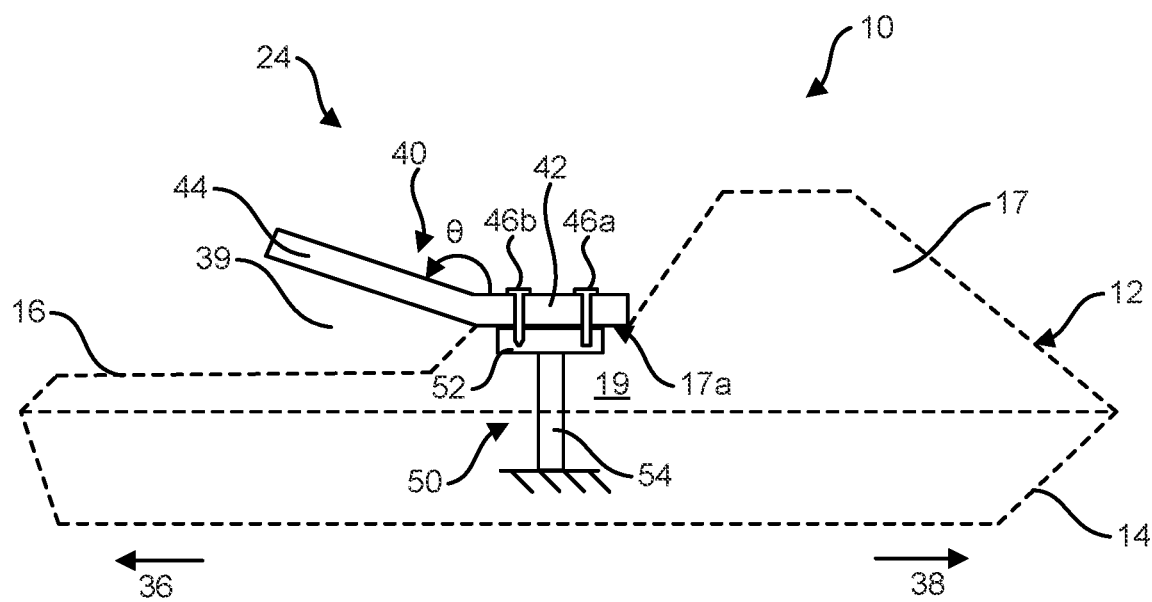
FIGS. 2A and 2B are simplified cross-sectional views illustrating a rigid seat support in accordance with one example of the present disclosure.
Figure 2B:
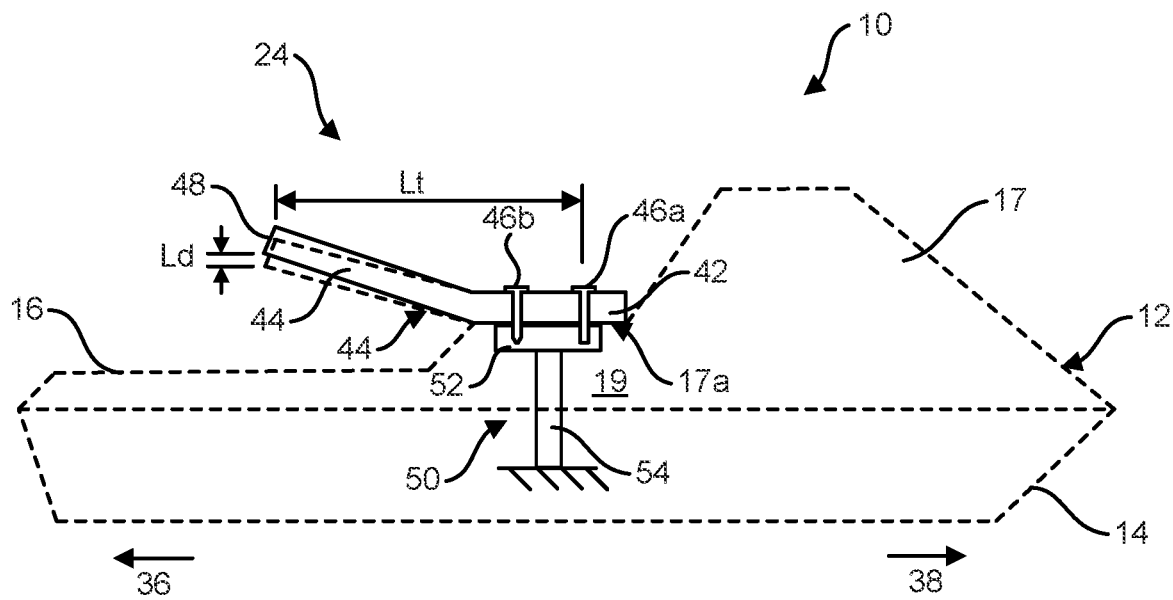
Figure 3:
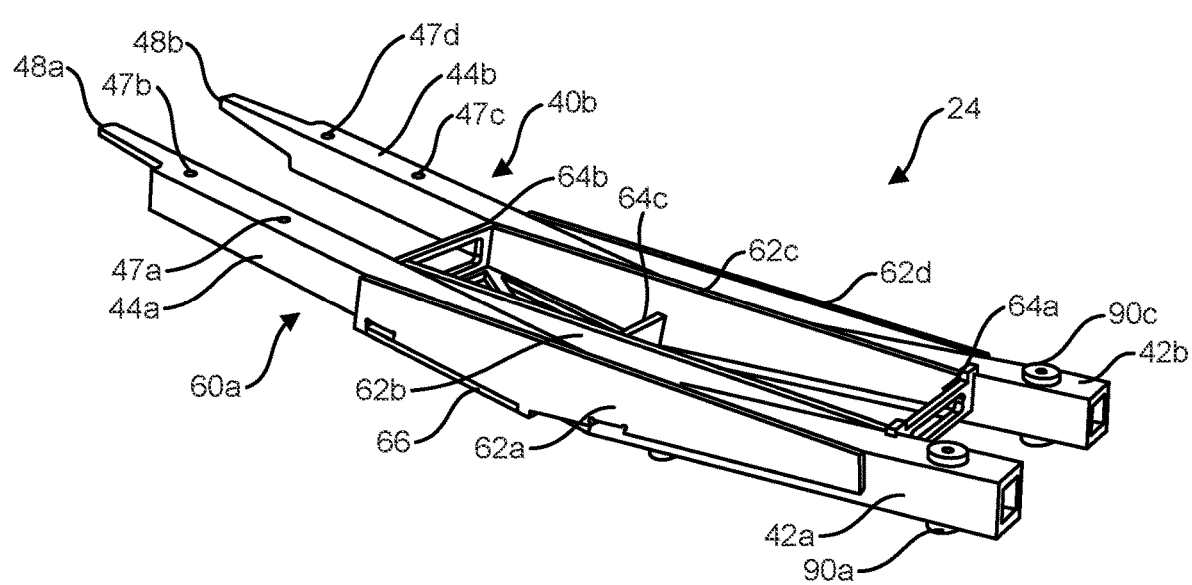
FIG. 3 is a perspective view illustrating a rigid seat support, according to one example of the present disclosure.
Figure 4:
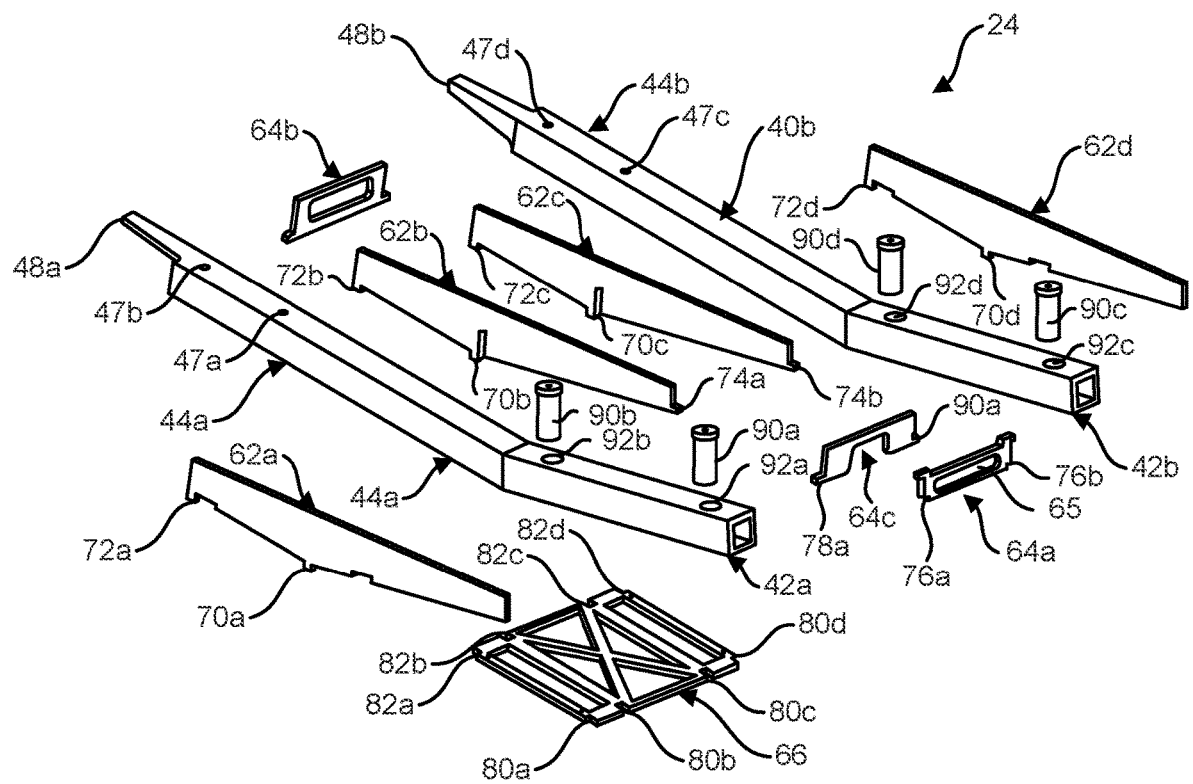
FIG. 4 is an exploded view illustrating a rigid seat support, according to one example of the present disclosure.
Figure 5:
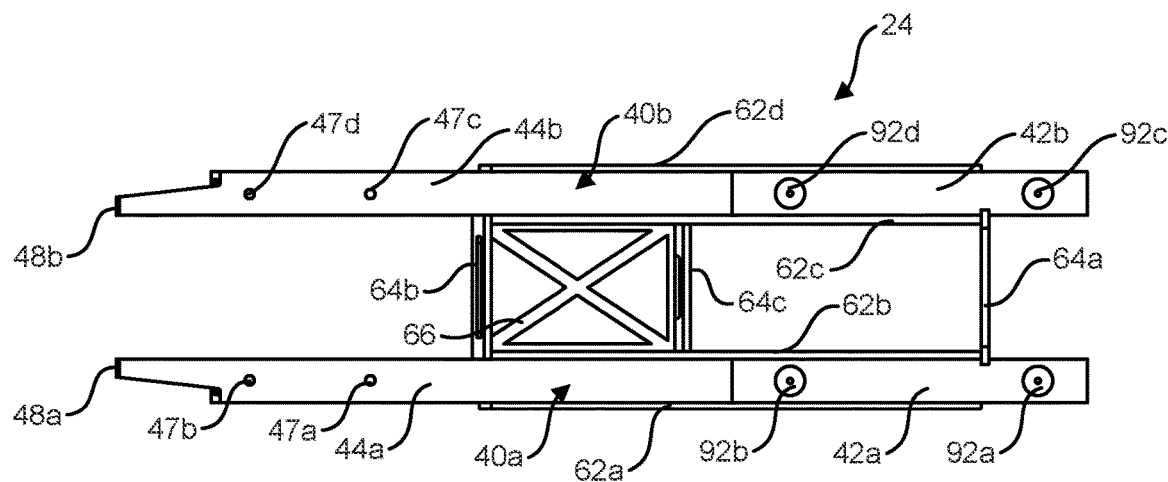
FIG. 5 is a plan view illustrating a rigid seat support, according to one example of the present disclosure.
Figure 6:
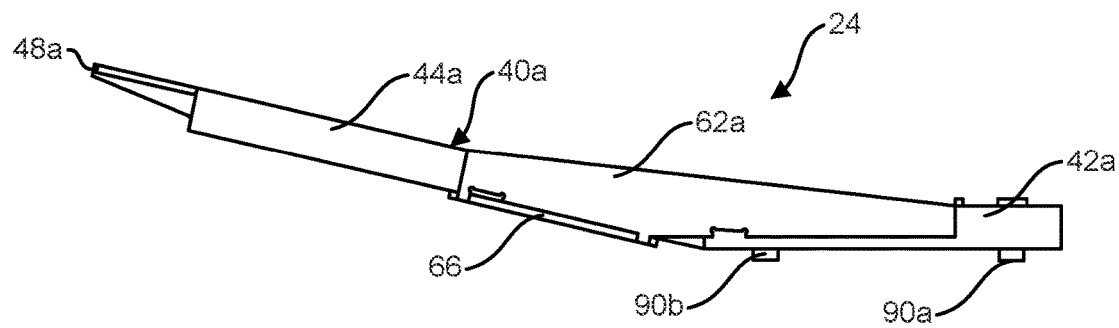
FIG. 6 is a side view illustrating a rigid seat support, according to one example of the present disclosure.

FIGS. 2A and 2B are simplified cross-sectional views illustrating portions of PWC 10 and generally illustrating rigid seat support 24, according to one example. In one example, rigid seat support 24 includes a base element 42 fixedly attached to deck body 12 and a cantilever element 44 fixedly and rigidly connected to base element 42, with base element 42 and cantilever element 44 together forming a longitudinally extending support beam 40. In examples, as illustrated, cantilever element 44 longitudinally extends unsupported over deck body 12 in aft direction 36 to form open space or area 39 between cantilever element 44 and rear platform 16 of deck body 12 which is free of supporting structure. In other words, there is no supporting structure beneath cantilever element 44, between cantilever element 44 and rear platform 16 to absorb any loads exerted on rigid seat support 24. Instead, any loads exerted on rigid seat support 24 by an operator or a passenger are transferred to deck body 12 through base element 42.

In one example, base element 42 and cantilever element 44 are formed of an integral, continuous piece of material. In one example, base element 42 and cantilever element 44 are formed of a contiguous piece of material. In one example, base element 42 and cantilever element 44 are separate components joined by a welded connection. In one example, base element 42 and cantilever element 44 are separate components joined through rivets and/or nuts and bolts. In one example, the base element and cantilever element may be formed as a single casted part, or as separate casted parts coupled together through welding, adhesive or mechanical fastening.

In examples, with reference to FIG. 1, at least a portion of operator position 30 is disposed on cantilever element 44 so as to be over open area 39. In other examples, an entirety of operator position 30 is disposed over open area 39 on cantilever element 44. In one example, cantilever element 44 is disposed at an angle, θ, relative to base element 42. In one example, angle, θ, is in a range from 155-180 degrees. In one example, angle, θ, is in a range from 165-170 degrees. In one example, as illustrated cantilever element 44 is disposed at an upward angle relative to rear platform 16. Although illustrated at an angle relative to base element 42, in examples, cantilever element 44 may extend in-line with base element 42 (i.e., at angle, θ, of 180 degrees). In one example, angle, θ, between base element 42 and cantilever element 44 is selected to position cantilever element 44 at an appropriate height above rear platform 16 and/or a bottom of footwell locations in deck body 12 for ergonomic purposes.

As described above, in examples, deck body 12 defines rear platform 16 by which a user (e.g., an operator or a passenger) may board PWC 10 from the water. In one example, deck body 12 further defines a superstructure 17 which is raised vertically relative to rear platform 16 and positioned in a forward direction 38 thereto. In one example, superstructure 17 of deck body 12 defines a seat mounting surface 17a to which base element 42 is fixedly attached. In one example, seat mounting surface 17a is a planar surface. In one example, seat mounting surface 17a is substantially horizontal or parallel with a waterline of PWC 10. In one example, seat mounting surface 17a is substantially parallel to rear platform 16. In another example, seat mounting surface 17a may be angled in relation to rear platform 16 or a waterline. In one example, base element 42 is fixedly attached to deck body 12 at seat mounting surface 17a via a number of fasteners 46, such as illustrated by fasteners 46a and 46b. Any number of suitable fastener types may be employed, such as nuts/bolts, for example. In examples, with further reference to FIG. 1, rigid seat support 24 is mounted to deck body 12 at a location at least partially forward of operator position 30. In another example, rigid seat support 24 is mounted to deck body 12 at a position entirely forward of operation position 30. Although illustrated as being rigidly mounted to superstructure 17, it is noted rigid seat support 24 may be rigidly connected to any suitable location on deck body 12.

In one example, as will be described in greater detail below (e.g., see FIGS. 8 and 9), rigid seat support 24 includes an interior support structure 50, including at least one stiffening member 52 to which base element 42 is rigidly coupled via fasteners 46, where interior support structure 50 is disposed within an interior cavity 19 formed by deck body 12 and hull 14. In one example, the interior support structure 50 may comprise stiffening ribs integrally formed with the deck body 12. In one example, base element 42 is fixedly coupled to stiffening member 52 with seat mounting surface 17a of deck body 12 sandwiched there between such that stiffening member 52 provides rigidity to and prevents deflection or bending of seat mounting surface 17a which, in turn, prevents deflection of base and cantilever elements 42 and 44. In one example, interior support structure 50 further includes an interior support 54 which may rigidly connect stiffening members 52 to hull 14 or deck body 12 so as to further stiffen and prevent deflection of rigid seat support 24.

With reference to FIG. 2B, in one example, rigid seat support 24 is implemented such that a length of vertical deflection, Ld, of an aft-most end 48 of rigid seat support 24 (in aft direction 36) does not exceed a specified percentage of a horizontal length, Lt, of rigid seat support 24 as measured from aft-most end 48 to a forward-most point of connection of rigid seat support 24 to deck body 12 (in forward direction 38), such as fastener 46a in FIG. 2B. In one example, Ld does not exceed 3% of Lt. In a further example, Ld does not exceed 2% of Lt. In a still further example, Lt does not exceed 1.5% of Lt. In one implementation, horizontal length, Lt, has a dimension of 750 mm, meaning that a distance of vertical deflection, Ld, may not exceed 11.25 mm.

FIGS. 3-6 respectively illustrate a perspective view, an exploded view, a plan view, and a side view of portions of rigid seat support 24, according to one example. In one example, rigid seat support 24 includes a plurality of longitudinally extending support beams 40. In one example, as illustrated, rigid seat support 24 includes a pair of longitudinally extending support beams 40a and 40b. In one example, support beams 40a and 40b extend in parallel with one another. In examples, each support beam 40 includes a base element 42 and a cantilever element 44, respectively illustrated as base elements 42a/42b and cantilever elements 44a/44b. In examples, base element 42 and cantilever element 44 are a contiguous body formed of a single piece of material. In one example, support beams 40 are formed of extruded aluminum (e.g., rectangular tubular aluminum). In other examples, base element 42 and cantilever element 44 are formed as separate pieces and fixedly joined together to form each support beam 40 (e.g., via a welded connection or via mechanical fasteners such as rivets and/or nuts and bolts).

In examples, such as described above and as illustrated by FIGS. 3-6, cantilever element 44 of each support beam 40 is disposed at an upward angle, θ, relative to base element 42 (see FIGS. 2A-2B). In one example, each cantilever element 44 includes a number of mounting holes 47, such as illustrated by mounting holes 47a-47d, to enable mounting of a grab bar thereto (e.g., see FIG. 11). In one example, rigid seat support 24 includes a plurality of ribs or gusset plates 62, such as illustrated by gusset plates 62a-62d, which are connected across a junction between base and cantilever elements 42 and 44 of each support beam 40 to increase a rigidity of rigid seat support 24 and control the distance of vertical deflection, Ld (see FIG. 2B). In one example, gusset plates 62 are connected to corresponding base and cantilever elements 42 and 44 via welding. In one example, gusset plates 62 are connected to corresponding base and cantilever elements 42 and 44 via mechanical connectors such as rivets and/or nuts and bolts. In one example where the base and cantilever elements 42 and 44 are formed from one or more casted parts, the gusset plates 62 may be replaced by ribs in the casted parts. In one example, gusset plates 62a and 62b are connected to opposing vertical surfaces of base and cantilever elements 42a and 44a of support beam 40a, and gusset plates 62c and 62c are connected to opposing vertical surfaces of base and cantilever elements 42b and 44b of support beam 40a.

In examples, rigid seat support 24 includes a plurality of transverse stiffener elements 64 rigidly connected between support beams 40, such as illustrated by transverse stiffener elements 64a-64c coupled between support beams 40a and 40*b*. In example, a forward transverse stiffener element 64*a* extends between facing vertical surfaces of base elements 42*a* and 42*b*, an aft transverse stiffener element 64*b* extends between facing vertical surfaces of cantilever elements 44*a* and 44*b*, and a central transverse stiffener element 64*c* extends between facing vertical surfaces of gusset plates 62*b* and 62*b*. In one example, as will be described in greater detail below (see FIG. 14) central transverse stiffener element 64*c* includes a mounting notch 65 to receive and engage a portion of seat pan 28 when seat 22 is mounted to rigid seat support 24. In one example, a stiffener web 66 is connected to and extends between lower surfaces of cantilever elements 44 of support beams 40, such as between lower surfaces of cantilever elements 44*a* and 44*b* of support beams 40*a* and 40*b*. Together, transverse stiffener elements 64 and stiffener web 66 provide additional stiffness to and prevent torsional movement of rigid seat support 24.

In one example, each gusset plate 62 includes a pair of downward extending tabs 70 and 72, with interior gusset plates 62*b* and 62*c* including forward extending longitudinal tabs 74. In one example, tabs 74*a*/74*b* and tabs 70*b*/70*c* on interior gusset plates 62*b* and 62*c* respectively interlock with notches 76*a*/76*b* of forward transverse stiffener element 64*a*, and tabs 78*a*/78*b* of central transverse stiffener element 64*c*. In one example, downward extending tabs 70*a*-70*d* and 72*a*-72*d* of gusset plates 62*a*-62*b* respectively interlock with notches 80*a*-80*d* and 82*a*-82*d* of stiffener web 66.

In one example, each base element 42 includes a number of threaded inserts 90 disposed within corresponding apertures 92, such as illustrated by threaded inserts 90*a* and 90*b* corresponding to apertures 92*a* and 92*b* of base element 42*a*, and threaded inserts 90*c* and 90*c* corresponding to apertures 92*c* and 92*c* of base element 42*b*. In examples inserts 90 are configured to receive fasteners 46 (e.g., see FIG. 2A) to rigidly connect base elements 42*a* and 42*b* to deck body 12, such as to seat mounting surface 17*a*.

Figure 7:
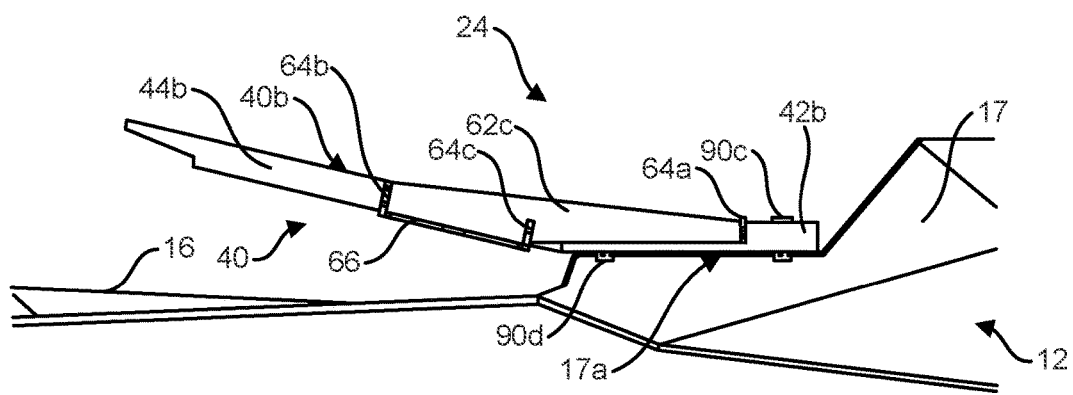
FIG. 7 is a cross-sectional view illustrating a rigid seat support mounted to a personal watercraft, according to one example of the present disclosure.
Figure 8:
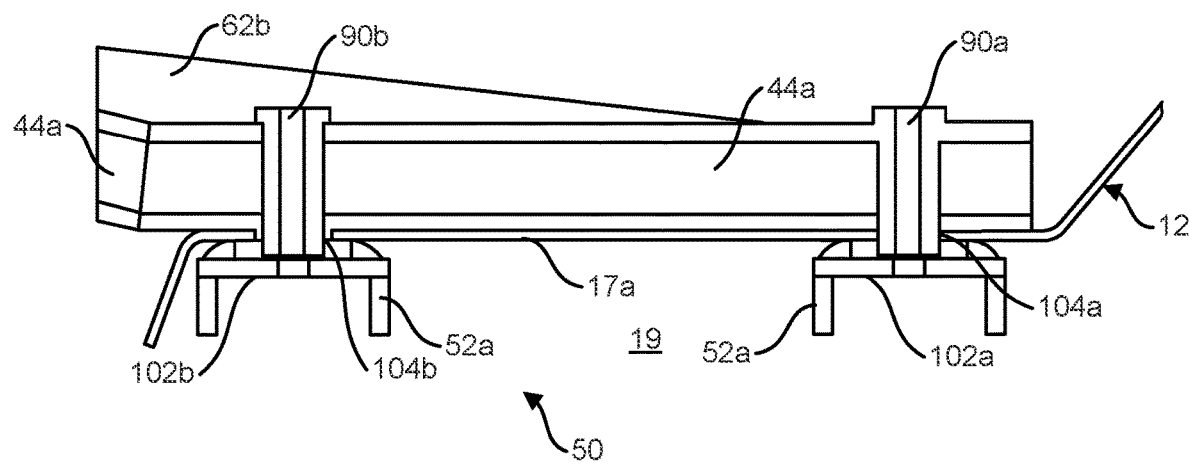
FIG. 8 is an enlarged cross-sectional view illustrating a rigid seat support mounted to a personal watercraft, according to one example of the present disclosure.
Figure 9:
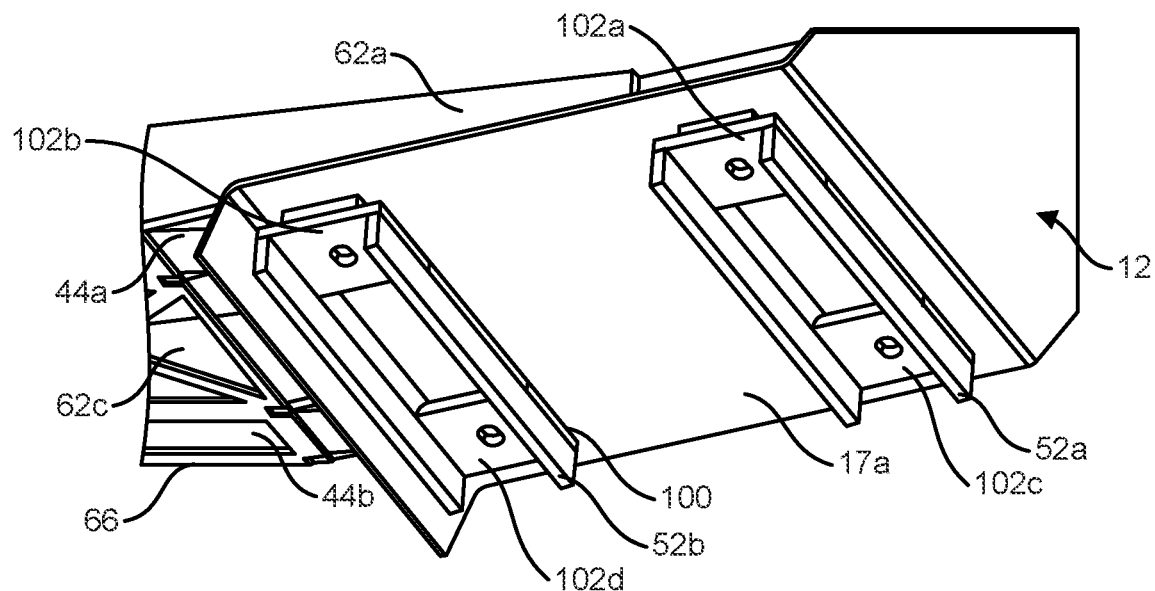
FIG. 9 is a perspective view illustrating a rigid seat support mounted to a personal watercraft, according to one example of the present disclosure.

FIG. 7 is a cross-sectional view generally illustrating rigid seat support 24 attached at mounting surface 17*a* of deck body 12, according to one example. FIGS. 8 and 9, respectively, represent an enlarged cross-sectional view and a perspective view of an underside deck body 12 illustrating the attachment of base element 44*a* to mounting surface 17*a*.

Figure 10:
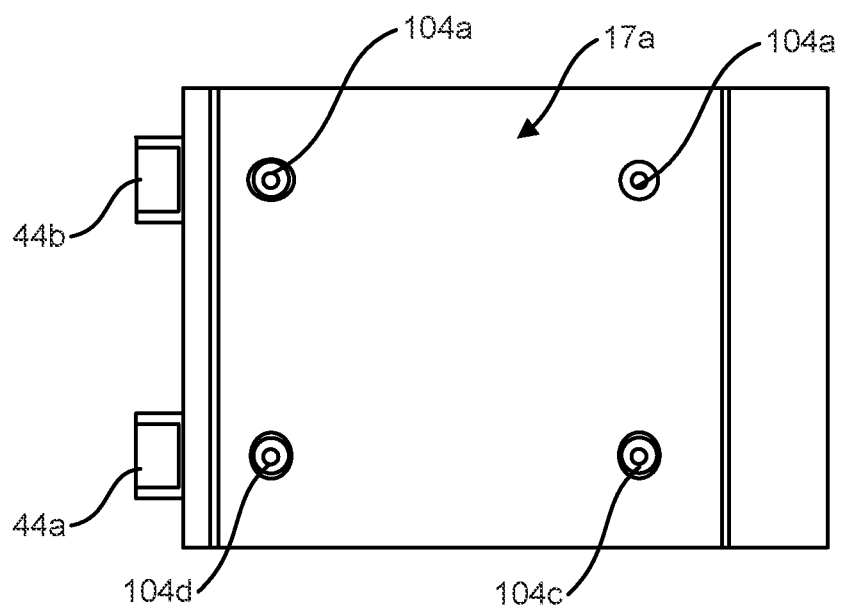
FIG. 10 illustrating a bottom view of a seat mounting surface of a deck of a personal watercraft, according to one example of the present disclosure.

FIG. 10 is a bottom view of mounting surface 17*a* of deck body 12. In one example, interior support structure 50 includes a pair of stiffening members 52*a* and 52*b* disposed on the underside of mounting surface 17*a* within interior cavity 19. In one example, as illustrated, stiffening members 52*a* and 52*b* extend longitudinally in a transverse direction relative to base elements 42*a* and 42*b*. In one example, the stiffening members 52*a* and 52*b* of the interior support structure 50 may be stiffening ribs that are integrally formed with the deck body 12. In one example, the stiffening members 52*a* and 52*b* may be separate components from the deck body 12. In one example, stiffening members comprise aluminum c-channel members. In one example, opposing ends of each stiffening member 52*a* and 52*b* include notches, such as indicated by notch 100, with each notch holding captive a corresponding threaded nut, indicated as threaded nuts 102*a*-102*d*. As illustrated, each threaded nut 102*a*-102*d* aligns with and corresponds to threaded inserts 90*a*-90*d* of base elements 42*a* and 42*b*. In one example, rigid seat support 24 is attached to deck body 12 by threading bolts (such as illustrated by bolts 46*a* and 46*b* in FIGS. 2A and 2B) through threaded inserts 90*a*-90*d*, through corresponding apertures 104*a*-104*d* in mounting surface 17*a*, and into corresponding captive threaded nuts 102*a*-102*d*.

Figure 11:
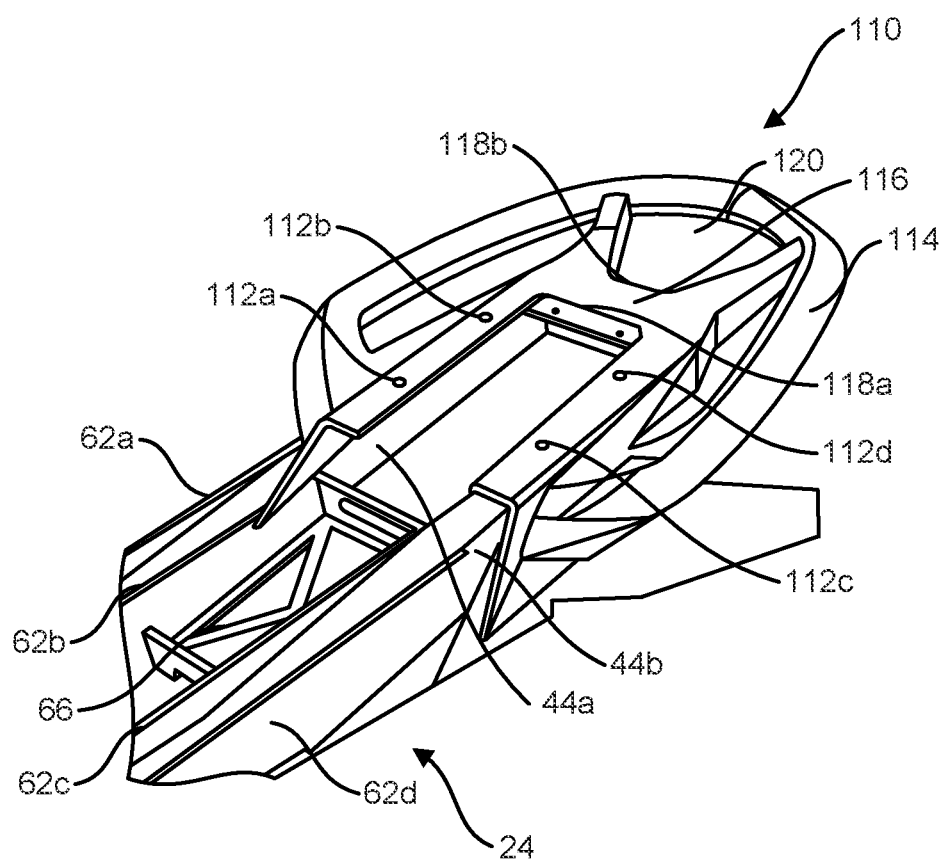
FIG. 11 is perspective view illustrating a rigid seat including a grab bar, according to one example of the present disclosure.

FIG. 11 is a perspective view illustrating portions of rigid seat support 24 including a grab bar 110. In one example, grab bar 110 is rigidly mounted to the aft ends of cantilever elements 44*a* and 44*b*. In one example, as illustrated, grab bar 110 is mounted to cantilever elements 44*a* and 44*b* via a plurality of fasteners 112, illustrated as fasteners 112*a*-112*d*, via corresponding mounting holes 47*a*-47*d* in cantilever elements 44*a* and 44*b* (e.g., see FIGS. 3-6). In one example, grab bar 110 forms a handle 114 extending along the perimeter sides and aft ends of cantilever elements 44*a* and 44*b* which assist a user in boarding PWC 10 from the water via rear platform 16 (see FIG. 1) and which a passenger may hold onto during operation of PWC 10 when seated in passenger position 32 of seat 22. In one example, grab bar 110 includes a crossbar 116 which engages aft-most ends 48*a* and 48*b* of cantilever elements 44*a* and 44*b* (e.g., see FIG. 3), with crossbar 116 having a forward facing edge 118*a* and an aft facing edge 118*b* defining a grab opening 120 with handle 114. As described below, in examples, forward edge 118*a* and aft facing edge 118*b* are employed to engage and assist in selectively securing seat 22, via seat pan 28 to rigid seat support 124 (e.g., see FIGS. 14 and 15).

Figure 12:
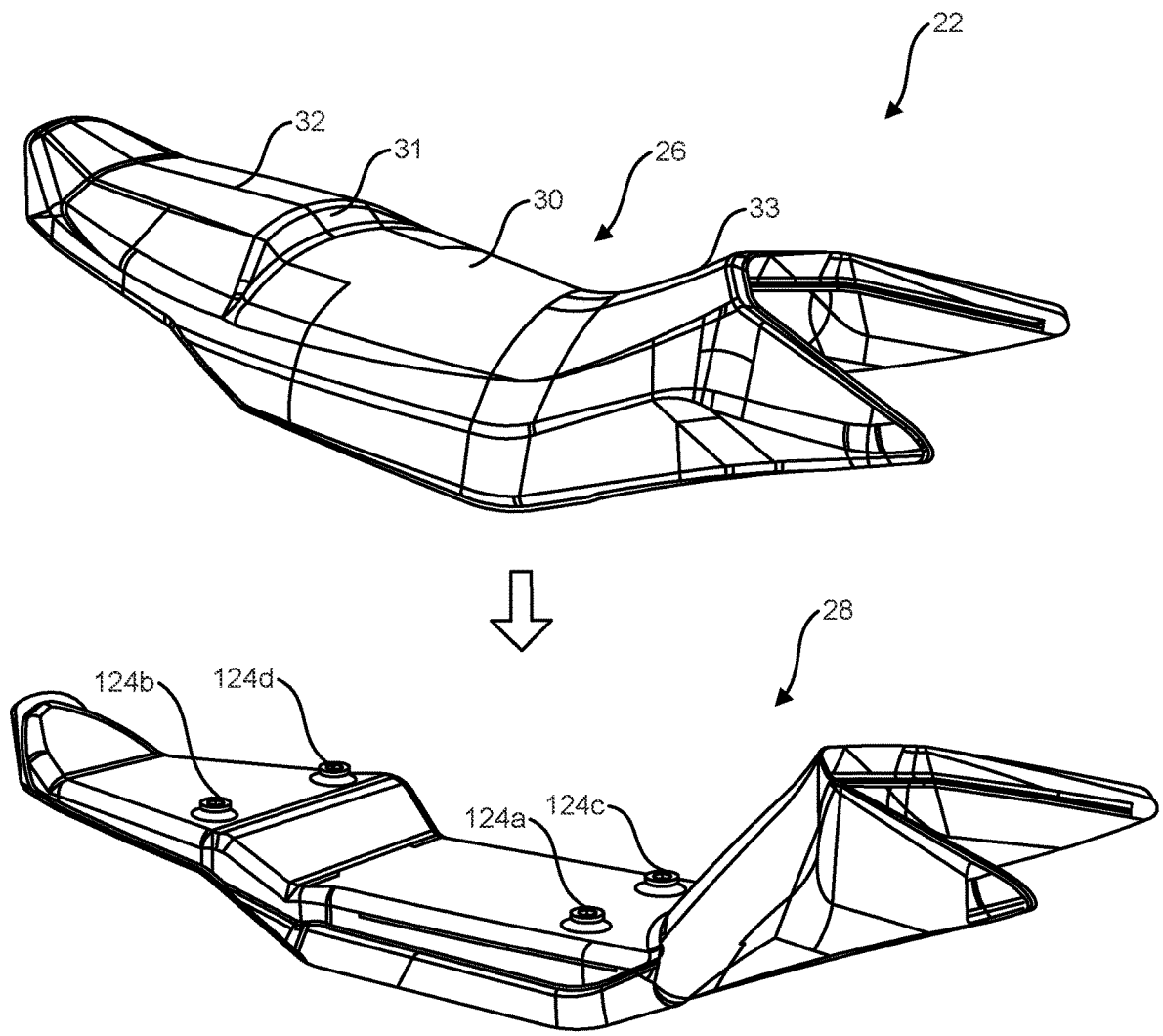
FIG. 12 is perspective exploded view illustrating a seat, including a seat cushion and a seat pan, according to one example of the present disclosure.

FIG. 12 is an exploded view of seat 22 illustrating perspective views of seat cushion 26 and seat pan 28, according to one example. In one example, seat cushion 26 is made of a foam material covered with a watercraft grade finishing material. In examples, a thickness and density of the foam material may be selected to provide desirable cushioning and shock absorption for a user. In examples, seat cushion 26 defines an operator position 30 and a separate passenger position 32. In one example, passenger position 32 is in an aft direction and in high vertical position relative to operator position 30. In one example, seat cushion 26 defines a transition between operator position 30 and passenger position 32, such as via an angled transition portion 31. In other examples, seat 26 may include no discernable transition between operator position 30 and passenger position 32. In one example, seat cushion 26 narrows in width as it extends in the aft direction 36 from operator position 30 to passenger position 32.

In one example, seat cushion 26 includes a shroud portion 33 extending in a forward direction 38 of operator position 30. In one example, when seat 22 is mounted to rigid seat support 24, shroud portion 33 extends over at least a portion of base element 42 of rigid seat support 24. In one example, when seat assembly 20 is mounted to deck body 12, shroud portion 33 extends forward at an upward angle from operator position 30 and provides a cushioned transition between operator position 30 and superstructure 17 (e.g., see FIG. 1) and integrates seat 22 with deck body 12.

In one example, seat pan 28 is contoured to generally match a contour of seat cushion 26 and includes a plurality of studs 124, illustrated as 124*a*-124*d*, for securing to seat cushion 26. In examples, seat pan 28 may be formed of any suitable material, or materials, including, for example, any suitable type of plastic material.

Figure 13:
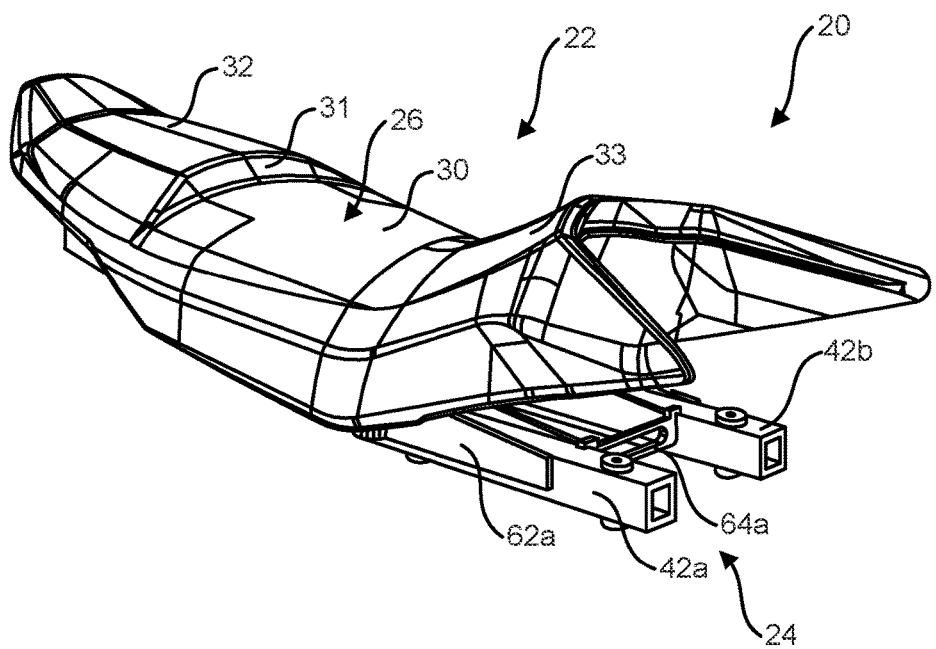
FIG. 13 is a perspective view illustrating a seat attached to a rigid seat support, according to one example of the present disclosure.
Figure 14:
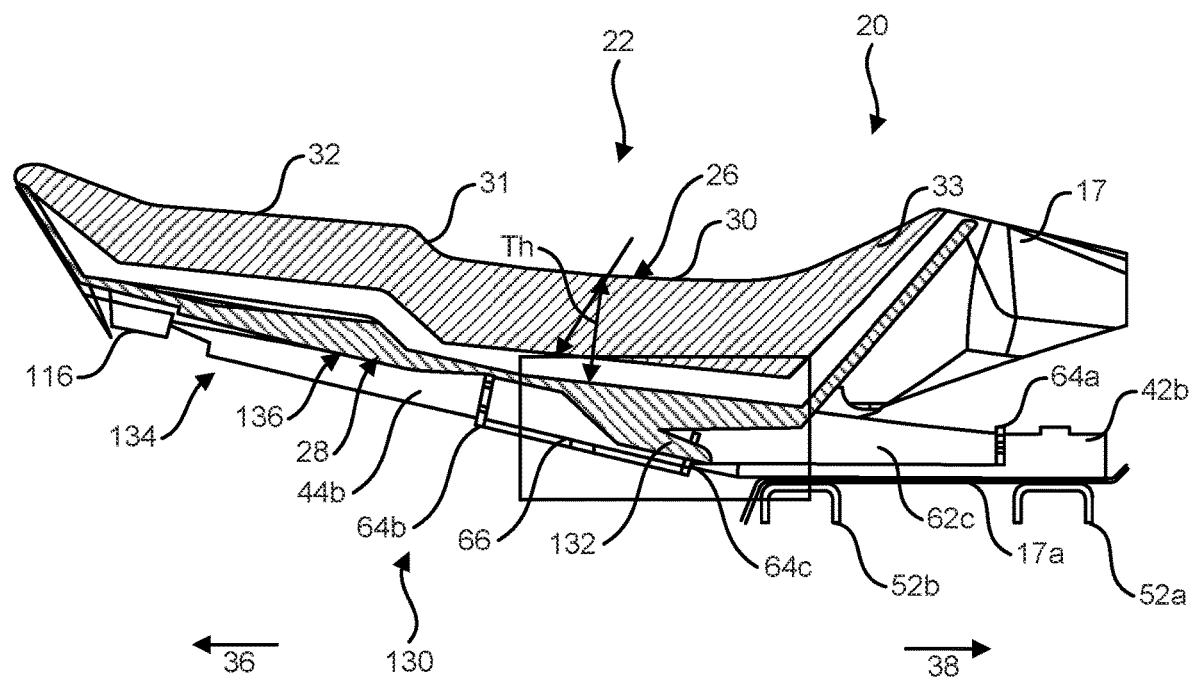
FIG. 14 is a cross-sectional view illustrating a seat attached to a rigid seat support, according to one example of the present disclosure.

FIGS. 13 and 14 respectively illustrate perspective and cross-sectional views of seat assembly 20 showing seat 22 attached to rigid seat support 24. With reference to FIG. 14, seat cushion 26 is coupled to seat pan 28, and has a thickness, Th, which may vary across a length of seat 22. As described above, in one example, seat cushion 26 is made of a foam material having a thickness, a density (e.g., pounds per cubic foot (PCF), and a firmness (e.g., an Indentation Deflection Force (IDF), Indentation Load Deflection (ILD)) to provide a desired cushioning and shock absorption effect for riders of PWC 10. In one example, seat cushion 26 has a thickness, Th, which varies between 50 mm and 100 mm. In some examples, seat 22 is releasably attached to rigid seat support 24 such that seat 22 can be readily attached and detached from seat support 24 without the need for tools. In examples, detachment of seat 22 from rigid seat support 24 enables access to various storage spaces.

With reference to FIG. 14, in one example, seat pan 28 includes a quick-release connection system 130 for releasably securing seat 22 to rigid seat support 24. In one example, quick-release connection system 130 includes a mounting finger 132 and a clip system 134 disposed on an underside 136 of seat pan 28 to engage crossbar 116 of grab bar 110. In one example, mounting finger 132 extends from underside 136 in forward direction 38 and is configured to slide into and be received and engaged by mounting notch 65 of central transverse stiffener element 64c (see FIGS. 3 and 4) so as to secure a forward portion of seat 22 to rigid seat support 24. In one example, mounting finger 132 is tapered so that a leading edge (in forward direction 38) is narrower than a trailing portion such that mounting finger 132 forms a wedge to engage mounting slot 65 as seat 22 is slid in forward direction 38.

Figure 15:
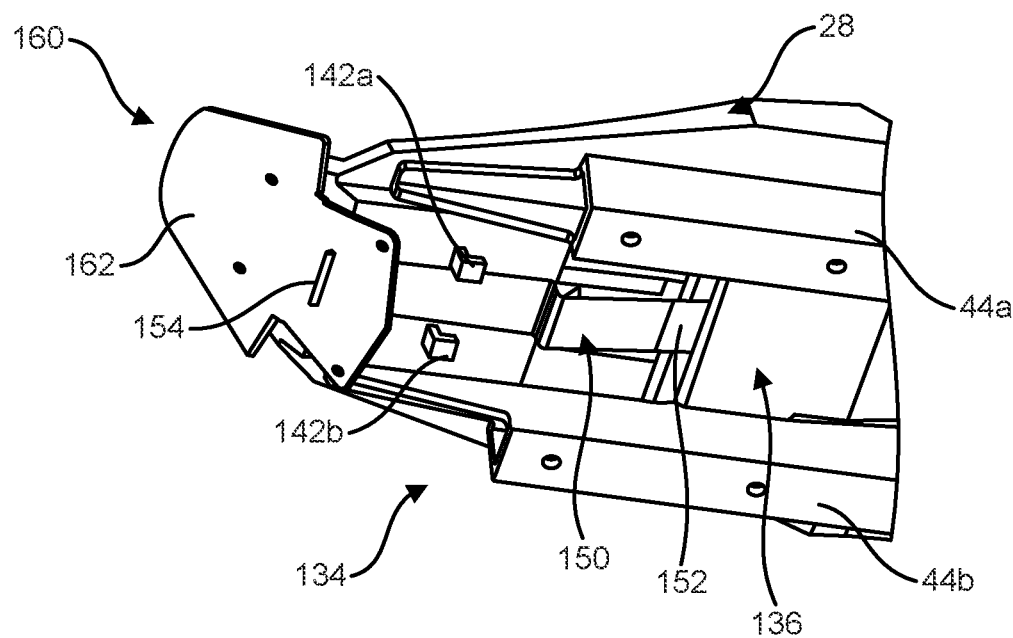
FIG. 15 is a bottom perspective view illustrating portion of a seat 22, including a clip system, according to one example of the present disclosure.
Figure 16:
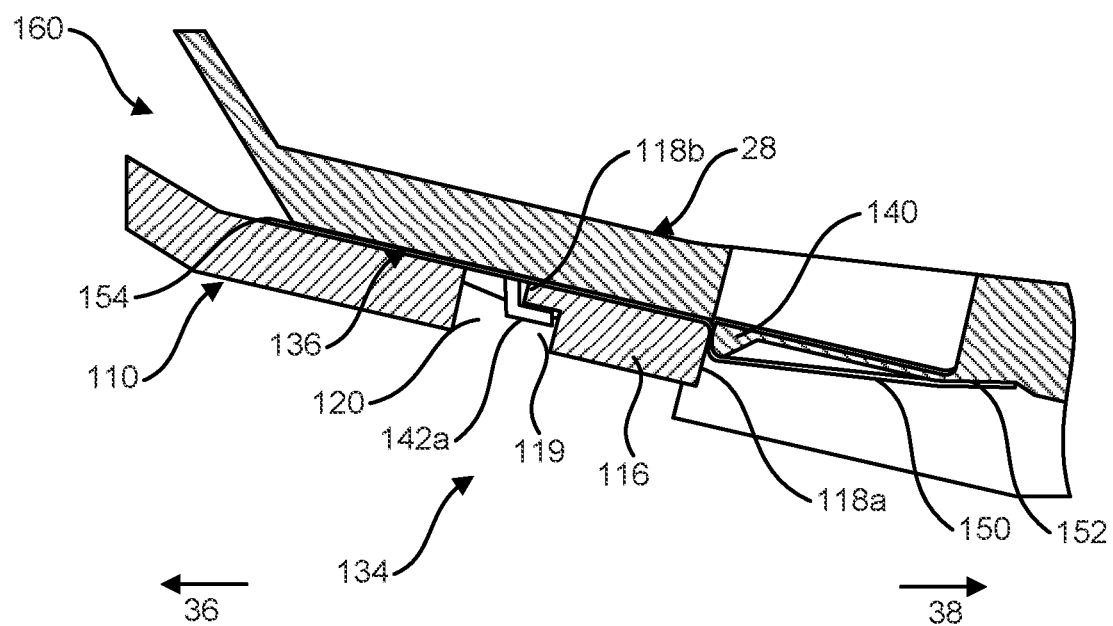
FIG. 16 is cross-sectional view illustrating portions of a seat 22, including a clip system, according to one example of the present disclosure.

FIGS. 15 and 16 respectively illustrate a bottom perspective view and a cross-sectional view of portions of seat pan 28, including clip system 134, when installed on rigid seat support 24, according to one example. In one example, clip system 134 includes a clip 140 and a mounting hook 142, illustrated as mounting hooks 142a and 142b in FIG. 15, each extending downwardly from underside 136 of seat pan 28. In examples, clip 140 comprises an elastic spring clip which is downwardly biased away from underside 136 of seat pan 28. A release strap 150 is connected at a first end 152 to seat pan 28 at a location forward of clip 140. Release strap 150 extends across clip 140 in aft direction 136 so as to be accessible at an aft end 160 of seat 22 (e.g., see FIG. 17). In one example, a second end 154 of release strap 150, opposite first end 152, extends through a close-out panel 162 mounted at aft end 160 of seat 22 (where close-out panel 162 is configured to conceal from view portions of seat 22 and rigid seat support 24).

Figure 17:
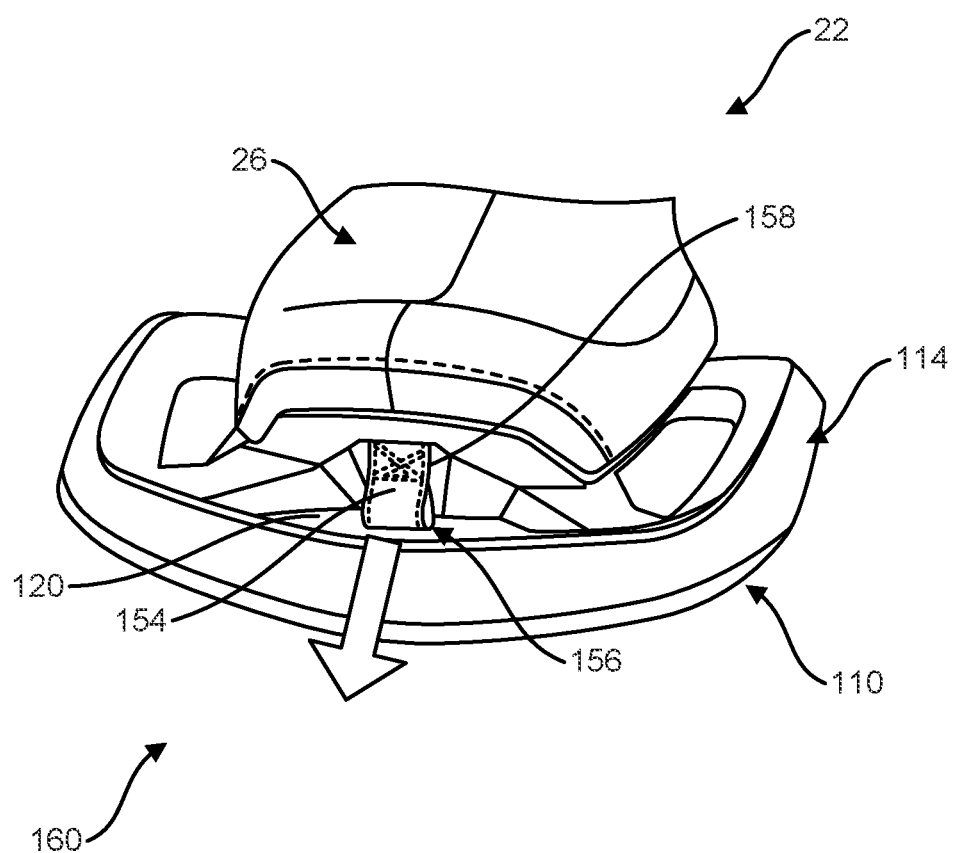
FIG. 17 is a rear perspective view illustrating portions of a seat, according to one example of the present disclosure.

FIG. 17 is a rear perspective view of illustrating portions of seat 22 including seat cushion 26 and grab bar 110. In one example, second end 154 of release strap 150 extends through an opening 158 in cross-bar 116 and terminates in a finger loop 156.

With reference to FIGS. 14-17, in examples, to install seat 22 on rigid seat support 24, aft end 60 is upwardly raised (such that a forward portion of seat 22 is tilted downward) as seat 22 is slid in forward direction 38 to insert mounting finger 132 within mounting notch 65 of central transverse stiffener element 64c. As seat 22 is slid in forward direction 38, aft end 60 is lowered to position mounting hooks 142a and 142b within grab opening 120 of grab bar 110. As seat 22 continues to be slid in forward direction 38, mounting hooks 142a and 142b engage a notch 119 along aft-facing edge 118b of crossbar 116 of grab bar 110, and spring clip 140 snaps downwardly upon passing over cross-bar 116 to engage forward-facing edge 118a. At such point, seat 22 is secured to rigid seat support 24 with mounting finger 140 and mounting hooks 142a/142b preventing vertical movement of seat 22, and mounting finger 140, mounting hooks 142a/142b, and spring clip 140 preventing longitudinal movement of seat 22 along rigid seat support 24.

In examples, to release seat 22 from rigid seat support 24, release strap 150 is pulled in aft direction 36, such as by finger loop 156 (as indicated by the directional arrow in FIG. 17). As release strap 150 is pulled in aft direction 36, release strap 150 forces spring clip 140 upward so as to no longer engage forward-facing edge 118a of crossbar 116. With spring clip 140 no longer engaging forward-facing edge 118a, as release strap 150 continues to be pulled and lifted upward, mounting hooks 142a/142b disengage from notch 119 and are lifted from grab opening 120, and mounting finger 132 is removed from mounting notch 65 of central transverse stiffener element 64c, thereby releasing seat 22 from rigid seat support 24.

It is noted that, in addition to the implementation explicitly illustrated herein, any number of different implementations may be employed to provide quick-release connection system 130 for releasably securing seat 22 to rigid seat support 24. Additionally, it is further noted that, in other examples, a quick-release connection system may not be employed, and seat 22 may be fixedly connected to rigid seat support 24.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A personal watercraft comprising:
 a hull;
 a deck disposed on the hull; and
 a rigid seat support including:
  a base element fixedly attached to the deck; and
  a cantilever element fixedly connected to the base element and longitudinally extending unsupported over the deck in an aft direction to form an area free of structure between an underside of the cantilever element and the deck; and
 a seat mounted to the rigid seat support, the seat comprising:
  a seat pan; and
  a seat cushion disposed on an upper side of the seat pan, the seat cushion defining a driver position and a passenger aft of the driver position, wherein at least a portion of the driver position is positioned vertically over the cantilever element.

2. The personal watercraft of claim 1, the deck including a mounting surface, the base element of the rigid seat support rigidly coupled to the mounting surface.

3. The personal watercraft of claim 2, the deck defining a rear platform, the mounting surface positioned forward of the rear platform, the cantilever element extending unsupported over the rear platform.

4. The personal watercraft of claim 3, the cantilever element extending at an upward angle relative to the rear platform.

5. The personal watercraft of claim 3, the deck defining an elevated superstructure forward of the rear platform, the mounting surface disposed on the superstructure.

6. The personal watercraft of claim 3, the mounting surface comprising a planar surface parallel to at least one of the rear platform and a waterline of the personal watercraft.

7. The personal watercraft of claim 1, wherein an entirety of the driver position is positioned vertically over the cantilever element.

8. The personal watercraft of claim 7, the base element positioned forward of the driver position.

9. The personal watercraft of claim 1, the rigid seat support having a horizontal length from a forward most connection point to the deck to an aft-most end of the cantilever element in a range from 60 to 85 centimeters.

10. The personal watercraft of claim 9, the aft-most end of the cantilever element to deflect vertically downward by not more than 3% of the horizontal length.

11. The personal watercraft of claim 1, the rigid seat support including at least one stiffening member disposed on an underside of the deck opposite the base element, the base element rigidly fixedly attached to the at least one stiffening member with the deck sandwiched there between so as to fixedly attach the base member to the deck and reduce deflection of the deck.

12. The personal watercraft of claim 1, the base element comprising first and second longitudinally extending base elements, and the cantilever element including first and second longitudinally extending cantilever elements, the first cantilever element rigidly connected to and extending from the first base element and together forming a first longitudinal frame member, and the second cantilever element rigidly connected to and extending from the second base element and together forming a second longitudinal frame member, the first and second longitudinal frame members extending in parallel with one another.

13. The personal watercraft of claim 12, the deck and hull forming an interior space, the base element of each longitudinal frame member positioned on an outer surface of the deck, the rigid seat support system including an interior support structure disposed within the interior space to which the base element of each frame element is rigidly coupled.

14. The personal watercraft of claim 13, the deck including a horizontal mounting surface to which the base element of each frame member is rigidly coupled.

15. The personal watercraft of claim 13, the interior support structure including at least one interior stiffening member disposed along an inner surface of the deck facing the interior space, the base element of each longitudinal frame element coupled to the at least one interior stiffening member with the deck sandwiched there between to prevent deflection of the deck.

16. The personal watercraft of claim 12, for each longitudinal frame member, the cantilever element extending at an upward angle relative to base element.

17. The personal watercraft of claim 12, the rigid seat support structure including one or more transverse stiffener elements rigidly connected between the longitudinal frame members to add rigidity to the seat support structure.

18. The personal watercraft of claim 12, the rigid seat support structure including a stabilizer web rigidly connected between the cantilever elements of the longitudinal member to add rigidity to the seat support structure.

19. A seat assembly for a personal watercraft comprising:
a rigid seat support including:
a base element to be rigidly connected to a deck of the personal watercraft; and
a cantilever element rigidly connected to the base element and to extend unsupported above the deck in an aft direction when the base element is connected to the deck; and
a seat mounted to the rigid seat support, the seat comprising:
a seat pan; and
a seat cushion disposed on an upper side of the seat pan, the seat cushion defining a driver position and a passenger position aft of the driver position, wherein at least a portion of the driver position is positioned vertically over the cantilever element.

* * * * *